United States Patent
Ouvrier-Buffet et al.

(10) Patent No.: US 7,564,040 B2
(45) Date of Patent: Jul. 21, 2009

(54) DEVICE FOR CORRECTING A SIGNAL DERIVED FROM A DETECTOR

(75) Inventors: Patrice Ouvrier-Buffet, Saint Jorioz (FR); Francis Glasser, Eybens (FR); Marc Accensi, Moirans (FR)

(73) Assignee: Commissariat a l'Energie Atomique, Paris (FR)

(*) Notice: Subject to any disclaimer, the term of this patent is extended or adjusted under 35 U.S.C. 154(b) by 50 days.

(21) Appl. No.: 10/539,156

(22) PCT Filed: Nov. 25, 2003

(86) PCT No.: PCT/FR03/03488

§ 371 (c)(1),
(2), (4) Date: Mar. 24, 2006

(87) PCT Pub. No.: WO2004/063768

PCT Pub. Date: Jul. 29, 2004

(65) Prior Publication Data

US 2006/0202126 A1     Sep. 14, 2006

(30) Foreign Application Priority Data

Dec. 16, 2002  (FR) ................................. 02 15908

(51) Int. Cl.
*G01J 1/42* (2006.01)
(52) U.S. Cl. .................... 250/395; 250/336.1; 702/190; 702/193
(58) Field of Classification Search .................. None
See application file for complete search history.

(56) References Cited

U.S. PATENT DOCUMENTS

| | | | |
|---|---|---|---|
| 5,012,498 A | 4/1991 | Cuzin et al. | |
| 5,187,986 A * | 2/1993 | Takebe et al. | 73/766 |
| 5,619,125 A * | 4/1997 | Lakshmikumar | 323/315 |
| 6,211,664 B1 * | 4/2001 | Bonnefoy et al. | 324/102 |
| 6,346,708 B1 | 2/2002 | Montemont et al. | |
| 2002/0154729 A1 * | 10/2002 | Kamimura et al. | 378/19 |
| 2003/0105397 A1 * | 6/2003 | Tumer et al. | 600/436 |
| 2004/0129888 A1 * | 7/2004 | Kannan et al. | 250/370.07 |
| 2004/0178349 A1 * | 9/2004 | Kameshima | 250/370.11 |
| 2004/0245468 A1 * | 12/2004 | Arques | 250/336.1 |

FOREIGN PATENT DOCUMENTS

FR    2 819 054 A1    12/2000

* cited by examiner

*Primary Examiner*—David P Porta
*Assistant Examiner*—Yara B Green
(74) *Attorney, Agent, or Firm*—Brinks Hofer Gilson & Lione

(57) ABSTRACT

A device for processing a signal (i) derived from a particular detector, the device including an integrator for measuring the total charge transported by an input signal ($i_2$) feeding the integrator for a predetermined time interval. The device further includes a plurality of units for receiving detector signal (i) derived from the particle detector, reducing the background noise present in the detector signal (i), and producing the input signal ($i_2$). The invention is applicable to various devices and appliances for measuring flow of particles such as photons.

20 Claims, 2 Drawing Sheets

DEVICE FOR CORRECTING A SIGNAL DERIVED FROM A DETECTOR

PRIORITY CLAIM

This application claims benefit of priority to French Patent Application No. FR 0215908 filed Dec. 16, 2002.

TECHNICAL FIELD

The present invention concerns the analysis of a stream of particles received by a particle detector during a given time period, in particular with the aim of measuring the corresponding incident energy.

BACKGROUND

An important cause of the limited quality of signal processing is the background noise that is always present in the output current of the detector. This background noise comprises at least two components. The first component is known as the "dark current", in particular, the fluctuating current of thermal origin emitted by the detector, even when it is not receiving photons; the value of this current depends on the temperature of the detector and on its bias state. The second component is the "transient decay current", in particular, the fluctuating current that is manifested for a certain time after the reception of a photon by the detector; in detectors using semiconductor materials, the transient decay current is primarily due to crystal defects in these materials.

Consider the consequences of this background noise for the accuracy of measurements effected by prior art devices operating by integration.

In these devices, the output current of the detector is integrated directly, and a quantity deemed to represent the effect of the background noise is then subtracted from the charge calculated in this way to obtain a value representative of the incident energy proper. This conventional approach is probably motivated by the need to take account of the totality of the incident energy, including low values thereof, whence the absence of any current processing device on the input side of the integrator. However, as explained above, it is not possible to assign an accurate value to the background noise, in particular because of thermal drift, thermal fluctuations and the transient decay phenomenon. Because of this, prior art incident energy measurements are subject to errors, the magnitude of which is difficult to estimate.

SUMMARY

The detectors considered in the context of the present invention are known in the art, whether they are of unitary or matrix type, and regardless of the semiconductor or other materials from which they are constituted. For example, the detector may use a CdZnTe material and be exposed to X-rays. The output signals of these detectors may be either electrical currents or of a physical kind that can be converted into an electrical current in a manner known in the art. It will simply be assumed that the reception of a particle by the detector triggers an output signal having the form of a pulse of a certain width and the maximum amplitude of which is representative of the energy of that particle.

The invention further concerns measuring systems operating by integration, by means of which the total energy of the radiation received by the detector is measured over a predetermined time period by integrating the current derived from the detector over that time period.

The invention applies to any field in which the analysis of a stream of particles may be beneficial, for example, when the particles are photons, in radiology, fluoroscopy or imaging. It is particularly adapted to fields in which there is a need for a signal processing method which, although being of high quality (in the sense that said method provides very accurate measurements of the stream), uses for this purpose a compact device; this is the case in particular when the device consists of a matrix of pixels rather than a single detector (pixel), as the size of the electronics is then limited by the pitch of the pixels.

The invention therefore consists in relatively compact devices capable of reducing, in particle stream measurements, the portion caused by drift and fluctuations of the background noise present in the signals derived from a detector, in particular when the stream of particles is relatively weak.

The invention therefore provides, firstly, a device for processing a signal (i) derived from a particle detector, said device comprising an integrator for measuring the total charge transported by a signal ($i_2$) feeding said integrator for a predetermined time interval. According to the invention, this device further comprises a plurality of units for receiving the signal (i) derived from said detector, for reducing the background noise present in this signal (i) and for producing said signal ($i_2$).

The inventors have realized that modern signal detection means are inherently low-noise devices of sufficient accuracy for it to be feasible to envisage placing signal correction units on the upstream side of the integrator, rather than on its downstream side, without in so doing losing any significant portion of the information contained in this signal or generating significant unwanted components in this signal. Appropriate units may then be chosen to attenuate, or even eliminate, particular components of the signal constituting part of the background noise.

According to particular features of the invention, one of said units is adapted to eliminate the DC component of the background noise that consists essentially of the darkness current, thermal drift of which may be assumed to be sufficiently slow for it to be valid to consider the darkness current as a DC component. This unit could comprise a capacitor in series, for example.

According to further particular characteristics of the invention, one of said units is adapted to reduce the fluctuating component of the background noise that consists essentially of the darkness current fluctuations and the transient decay current.

According to even more particular features of the invention, said unit for reducing the fluctuating component of the background noise comprises:

a converter for associating with an input current an output voltage (e), followed by a threshold trigger for allowing current to pass when said voltage (e) exceeds a first predetermined threshold value ($\epsilon_1$) and for preventing current from passing when the voltage (e) falls below a second predetermined threshold value ($\epsilon_2$), followed by a converter for associating an input voltage with an output current.

To give a more concrete idea of what is being explained, it is assumed here that the voltage pulse e(f) takes positive values; it is a simple matter to transpose the features of the invention to a situation in which these values are negative.

Thus the device of the invention totally circumvents the electrical charge transported by the signal between the pulses, with the result that the background noise fluctuations have an effect only during the short duration of the pulses, during which the measurements are effected. This significantly improves the quality of the measurements compared to prior art devices.

The invention secondly provides a device for processing signals produced by a set of particle detectors, said device being noteworthy in that at least one of those signals is processed by means of a device as briefly described hereinabove.

It will be noted that the various devices of the invention may easily be implemented by means of standard miniaturized semiconductor components, as will be demonstrated in the detailed description hereinafter, with the result that these devices are of compact size and low unit cost.

Finally, the invention is directed to diverse apparatus for analyzing a stream of particles including a device of the kind briefly described hereinabove.

Other aspects and advantages of the invention will become apparent on reading the following detailed description of particular embodiments of the invention provided by way of non-limiting example. The description refers to the appended drawings, in which:

DETAILED DESCRIPTION

In the following description, reference will be made to the detection of "photons" (in particular, to measuring characteristics of electromagnetic radiation), but it is clear that the invention is totally independent of the nature of the particles detected.

Figure 1:
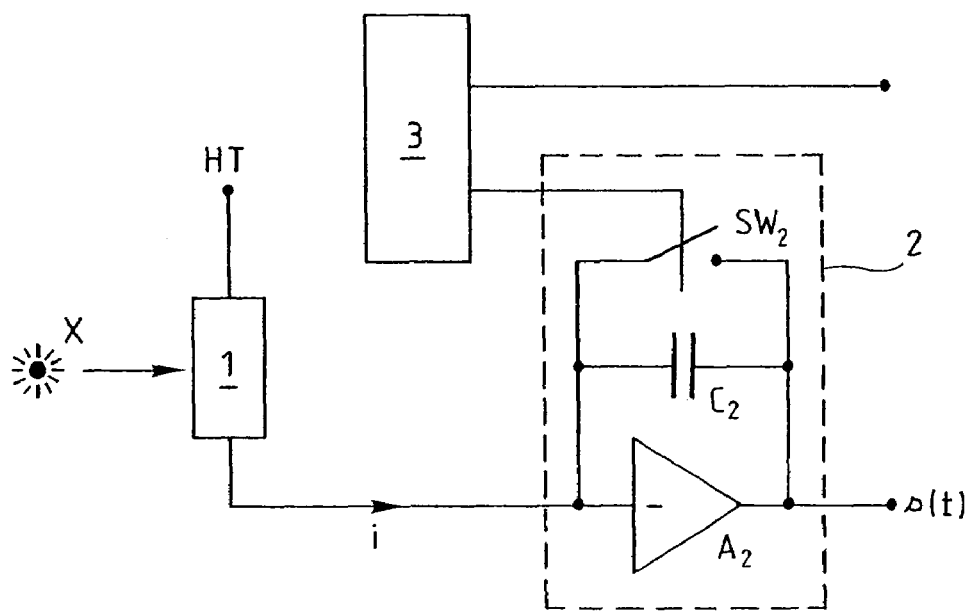
FIG. 1 represents a conventional device for processing a signal derived from a particle detector.

FIG. 1 represents a conventional device for processing a signal derived from a particle detector 1 which may use a CdZnTe material, be supplied with power by a high-tension supply HT and be used to measure X-rays, for example.

In response to the arrival of a photon at its receiving surface, the detector 1 emits a current pulse i. The current i is processed by an integrator 2 to produce an output signal s that represents the total electrical charge conveyed by the current i during the time t.

The integrator 2 may comprise an amplifier $A_2$ and a capacitor $C_2$ in parallel, for example. A switch $SW_2$ controlled by a logic unit 3 reinitializes the integration process at predetermined time intervals T.

Figure 2:
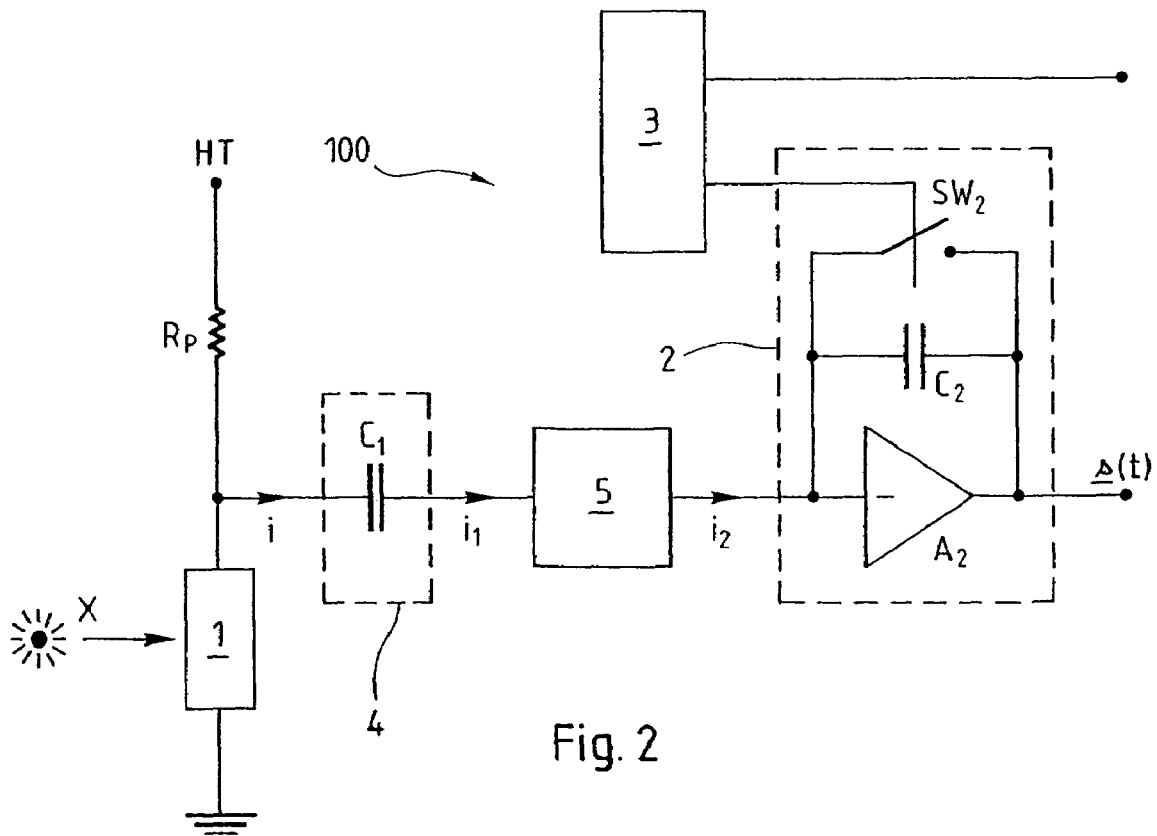
FIG. 2 represents one embodiment of a device of the invention for processing a signal derived from a particle detector.

FIG. 2 represents a device 100 for processing a signal derived from a particle detector 1 constituting one embodiment of the invention. The detector 1 is similar to that from FIG. 1. This device 100 comprises an integrator 2 and a logic unit 3 which are also similar to the corresponding units from FIG. 1.

In accordance with the invention, units 4 and 5 inserted between the detector 1 and the integrator 2 are adapted to receive the current i derived from the detector 1, reduce the background noise present in that current i and produce the current $i_2$ feeding the integrator 2.

In this embodiment, a bias resistor $R_p$ inserted between the detector 1 and the high-tension supply HT stabilizes the output voltage of the detector 1.

The current i derived from the detector 1 enters a unit 4 adapted to eliminate a DC component of the background noise. In this embodiment, this unit 4 is simply a capacitor $C_1$.

The output current $i_1$ of the unit 4 then enters a unit 5 adapted to reduce a fluctuating component of the background noise.

Finally, the output current $i_2$ of this unit 5 feeds the integrator 2, from which finally emerges the signal s(t) "corrected" in accordance with the invention.

Figure 3:
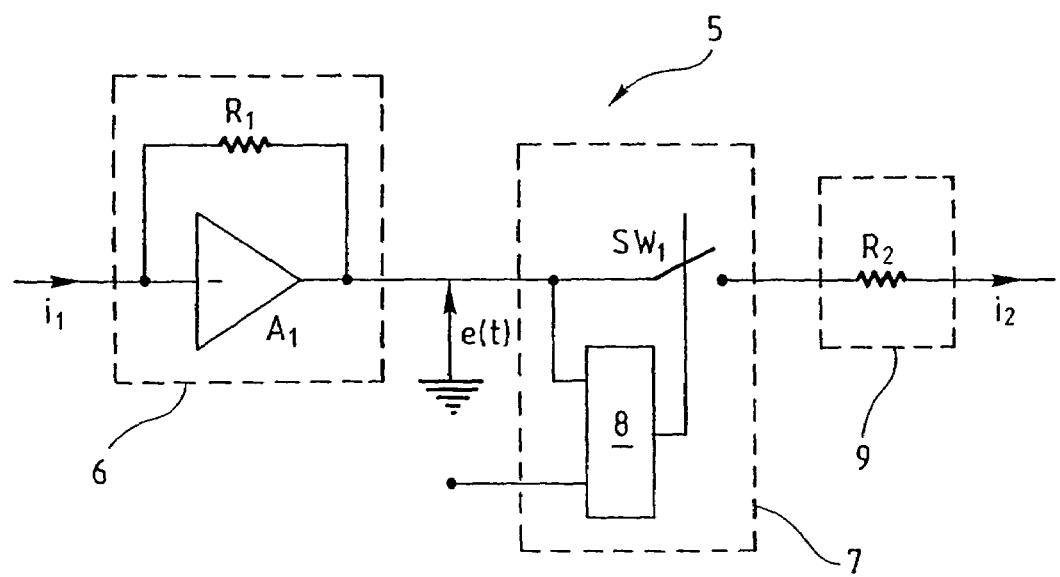
FIG. 3 represents one embodiment of the FIG. 2 device adapted to reduce the fluctuating component of the background noise.

FIG. 3 represents one embodiment of the unit 5 from FIG. 2.

In this embodiment, the current signal $i_1(t)$ derived from the unit 4 is converted into a voltage signal e(t) in the converter 6. In this embodiment, the converter 6 consists of an amplifier $A_1$ in parallel with a resistor $R_1$.

An alternative to this is to add a further component in parallel consisting of a capacitor (not shown), which converts the current amplifier $A_1$ into an amplifier of the electrical charges derived from the detector 1. It is then necessary to add a band-pass filter (not shown) in series with this combination so as to revert to a voltage that images the current derived from the detector 1. Like the above embodiment, this variant reduces the contribution of the background noise to the measurements, but with a better signal/noise ratio, in exchange for a slightly more complex configuration.

The unit 5 then comprises a threshold trigger 7, represented diagrammatically here in the form of a switch SW, controlled by a logic unit 8, and which could in practice comprise a comparator, for example.

The threshold trigger 7 allows current to pass when the voltage e(t) exceeds a first predetermined threshold value $\epsilon_1$ and prevents current from passing when the voltage e(t) falls below a second predetermined threshold value $\epsilon_2$. Said thresholds $\epsilon_1$ and $\epsilon_2$ are adjusted as a function of the intended application so that their value is sufficiently low to allow most of the current to pass during pulses resulting from the impact of a particle on the detector and sufficiently high to prevent the current from passing when the latter contains only the fluctuations of the darkness current and/or the transient decay current.

The unit 5 finally comprises a converter 9 that associates a current $i_2$ with the voltage signal at the output of the threshold trigger 7. In this embodiment, the converter 9 simply consists of a resistor $R_2$.

Figure 4:
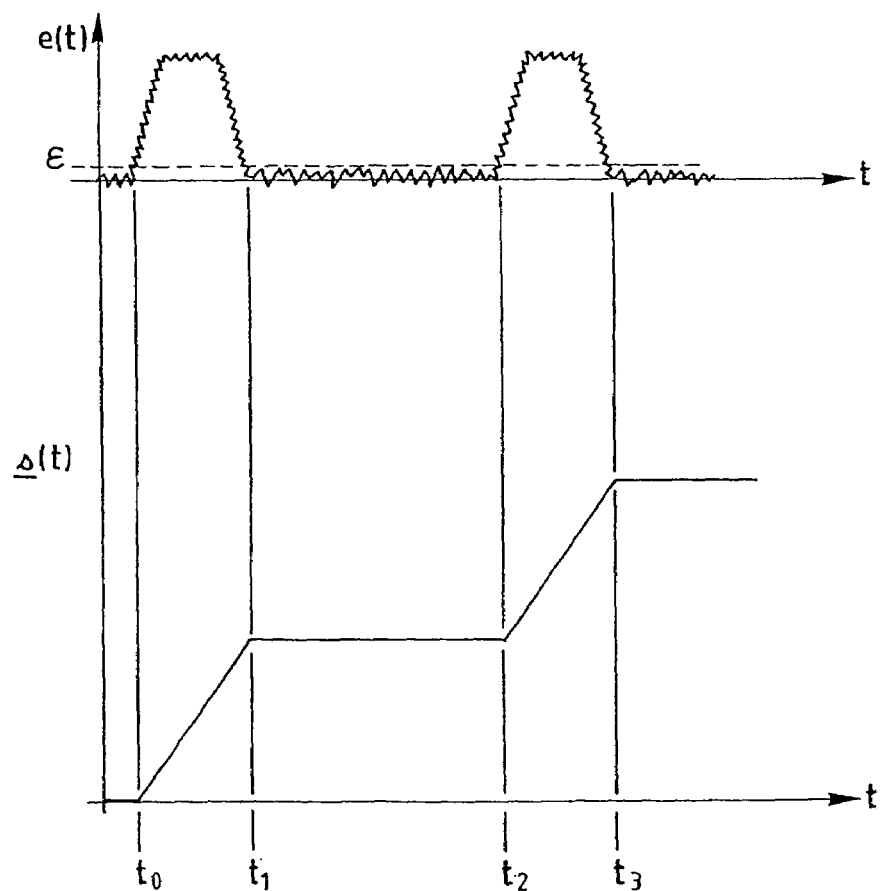
FIG. 4 shows how the signal derived from the integrator varies as a function of time when using the device represented in FIG. 3.

FIG. 4 shows the behavior of the signals e and s as a function of time t.

The function e(t) features a succession of pulses above the idle voltage (here taken as the origin), between $t=t_0$ and $t=t_1$, and then between $t=t_2$ and $t=t_3$, and so on; these pulses are naturally the translation via the units 4 and 6 of the pulses present in the current i. The curve of the voltage e(t) shown in FIG. 4 shows the irregularities caused by thermal fluctuations and the transient decay phenomenon; however, in practice, the relative amplitude of these irregularities is generally not as great as that shown here to explain the invention more clearly.

In this embodiment, the following condition applies for the triggering threshold of the threshold trigger 7: $\epsilon_1=\epsilon_2\equiv\epsilon$.

The curve representing the output signal s(t) of the device 100 of the invention thus shows the integration of the charges conveyed by the current i minus the DC component of the background noise in particular.

Observe that this signal s(t) remains constant in the time intervals situated between the pulses generated by the impact of a photon on the detector, such as the time interval between $t=t_1$ and $t=t_2$. Accordingly, thanks to the invention, the total charge measured is completely free of the background noise present in the time intervals between the pulses.

Secondly, the signal s(t) features rising portions in the time intervals corresponding to the impact of a photon on the detector, such as the time interval between $t=t_0$ and $t=t_1$ or between $t=t_2$ and $t=t_3$. The total charge measured is free of the DC component of the background noise present during the pulses, in the same way as it is eliminated in the time intervals between the pulses. Although it is true that the device of the invention does not eliminate the electrical charge caused by the fluctuating component of the background noise during the pulses, it is clear that this contribution to the total charge decreases as the total duration of the pulses relative to the total measuring time T decreases. The invention is therefore all the more advantageous the weaker the stream of particles, but it will further be noted that when the stream of particles concerned is strong, the total charge measured is high, and the fluctuating component of the current derived from the detector is then negligible anyway.

The present invention is not limited to the embodiments described hereinabove: in fact, the person skilled in the art may well conceive of diverse variants of the invention without departing from the scope of the following claims. For example, it is clear that instead of placing the unit 4 on the input side of the unit 5, between the detector 1 and the integrator 2, these units may equally well be in the opposite order, subject to appropriate adjustment of the thresholds $\epsilon_1$ and $\epsilon_2$.

The invention claimed is:

1. A device for processing a detector current supplied by a particle detector, said device comprising:
    a unit for reducing a fluctuating component of background noise present in said detector current and providing a treated detector current, said unit comprising:
    a converter for associating an intermediate voltage signal with said detector current;
    a threshold trigger for allowing said intermediate voltage signal to pass when said intermediate voltage signal exceeds a first predetermined threshold value and for preventing said intermediate voltage signal from passing when said intermediate voltage signal falls below a second predetermined threshold value, said threshold trigger providing a treated voltage signal; and
    a converter for associating said treated detector current with said treated voltage signal; and
    said device further comprising: an integrator for measuring a total charge transported by said treated detector current for a predetermined time interval.

2. The device according to claim 1, wherein said converter for associating said intermediate voltage signal comprises an amplifier in parallel with a resistor.

3. The device according to claim 1, wherein said threshold trigger comprises a comparator.

4. The device according to claim 1, wherein said converter for associating said treated detector current comprises a resistor.

5. A system comprising a set of particle detectors producing respective signals, and at least one of said devices according to claim 1 for processing at least one of said signals.

6. A system comprising a device according to claim 1, wherein said particle detector comprises a photon detector, wherein particles detected by said photon detector comprise photons.

7. The device according to claim 6, wherein the particle detector comprises a CdZnTe material, said particle detector adapted to measure X-rays.

8. A radiology apparatus comprising a device according to claim 1.

9. An imaging apparatus comprising a device according to claim 1.

10. A fluoroscopy apparatus comprising a device according to claim 1.

11. The device according to claim 1, further comprising a unit for reducing a direct component of the background noise in said detector current, said unit comprising a capacitor connected to said particle detector and an input to said unit for reducing the fluctuating component.

12. The device according to claim 1, wherein said integrator comprises an amplifier and a capacitor arranged in parallel.

13. The device according to claim 1 further comprising a logic unit to reinitialize the integration process at predetermined time intervals.

14. The device according to claim 1, wherein the total charge transported by said treated detector current represents a total energy of radiation received by said particle detector.

15. A device for processing a detector signal derived from a particle detector comprising:
    a unit for reducing a fluctuating component of background noise present in said detector signal and for producing an input signal, said unit comprising:
        a converter for associating an output voltage with an input current of said detector signal;
        a threshold trigger for allowing current to pass when said output voltage exceeds a first predetermined threshold value and for preventing current from passing when said output voltage falls below a second predetermined threshold value; and
        a converter for associating said input signal with an output current of said threshold trigger; and
    an integrator for measuring a total charge transported by said input signal feeding said integrator for a predetermined time interval.

16. A method for processing a detector current signal derived from a particle detector, said method comprising:
    sensing a detector current;
    associating an intermediate voltage with a current derived from said detector current;
    applying said intermediate voltage to a switch providing an output switch voltage, said switch allowing said intermediate voltage to pass when said intermediate voltage exceeds a first predetermined threshold value and preventing said intermediate voltage from passing when said intermediate voltage falls below a second predetermined threshold value;
    associating a processed current with said output switch voltage; and
    integrating a total charge transported by said processed current.

17. The method of claim 16, further comprising processing said detector current through a capacitor prior to the step of associating an intermediate voltage.

18. The method of claim 16, further comprising reinitializing the integration process at predetermined time intervals.

19. The method of claim 16, wherein said particle detector is used to measure X-rays.

20. The method of claim 16, wherein a stream of particles entering said particle detector is weak.

* * * * *